(12) United States Patent
Chung et al.

(10) Patent No.: US 8,841,044 B2
(45) Date of Patent: Sep. 23, 2014

(54) SOLID OXIDE FUEL CELL

(75) Inventors: Jong Ho Chung, Gyunggi-do (KR); Jai Hyung Gil, Seoul (KR); Kyong Bok Min, Gyunggi-do (KR); Jong Sik Yoon, Seoul (KR); Eon Soo Lee, Gyeongsangbuk-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/409,046

(22) Filed: Feb. 29, 2012

(65) Prior Publication Data

US 2013/0137013 A1 May 30, 2013

(30) Foreign Application Priority Data

Nov. 30, 2011 (KR) .................. 10-2011-0126808

(51) Int. Cl.
*H01M 8/10* (2006.01)

(52) U.S. Cl.
USPC ............ 429/497; 429/495; 429/509; 429/517

(58) Field of Classification Search
USPC .................... 429/495, 497, 509, 517
See application file for complete search history.

(56) References Cited

U.S. PATENT DOCUMENTS

| | | | |
|---|---|---|---|
| 2004/0234830 A1* | 11/2004 | Draper et al. | 429/30 |
| 2005/0095483 A1* | 5/2005 | Song et al. | 429/31 |
| 2007/0020494 A1* | 1/2007 | Horiuchi et al. | 429/26 |
| 2008/0096076 A1* | 4/2008 | Ohmori et al. | 429/30 |
| 2010/0081026 A1* | 4/2010 | Weil et al. | 429/30 |
| 2010/0330457 A1* | 12/2010 | Ohmori | 429/495 |

FOREIGN PATENT DOCUMENTS

KR 10-2011-0028964 3/2011

* cited by examiner

*Primary Examiner* — Ula C. Ruddock
*Assistant Examiner* — Lisa S Park Gehrke
(74) *Attorney, Agent, or Firm* — Ladas & Parry, LLP

(57) ABSTRACT

Disclosed herein is a solid oxide fuel cell, including: a unit cell; a current collector formed in a flat shape having a first surface and a second surface, the first surface including a groove formed in a thickness direction so as to receive the unit cell therein; and a circular support member formed between the first surface and the second surface of the current collector, wherein the support member is provided in plural, and the support members for respective regions have different diameters.

10 Claims, 2 Drawing Sheets

SOLID OXIDE FUEL CELL

CROSS REFERENCE TO RELATED APPLICATION

This application claims the benefit of Korean Patent Application No. 10-2011-0126808, filed on Nov. 30, 2011, entitled "Solid Oxide Fuel Cell", which is hereby incorporated by reference in its entirety into this application.

BACKGROUND OF THE INVENTION

1. Technical Field

The present invention relates to a solid oxide fuel cell.

2. Description of the Related Art

Renewable energy problems have become major national and social issues. Fuel cells among them can generate energy such as electricity or the like from alternative energy sources of hydrogen or the like as well as petroleum, LNG, LPG, and thus, interests concerning the above have been increased.

Among various types of fuel cells that directly transform chemical energy of fuel into electric energy by an electrochemical reaction, a solid oxide fuel cell (SOFC) (Document 1) has advantages in that theoretical efficiency thereof is high and various kinds of fuel are usable without a modifier, and thus, active studies on the solid oxide fuel cell are proceeding so as to be commercialized for homes or for generation in various fields.

However, since the solid oxide fuel cell (SOFC) is operated at a high temperature of about 800° C., there exist technical subjects related to development of a suitable material bearing durability or structures for stably outputting high power; technical objects such as heat and water management, power conversion, control, operation of system, and the like; and problems with respect to low-cost materials or structures in view of costs.

[Document 1] KR 2011-0028964 A 2011.03.22

SUMMARY OF THE INVENTION

The present invention has been made in an effort to provide a solid oxide fuel cell capable of improving current collection resistance at the time of current collection in a unit cell.

According to one preferred embodiment of the present invention, there is provided a solid oxide fuel cell, including: a unit cell; a current collector formed in a flat shape having a first surface and a second surface, the first surface including a groove formed in a thickness direction so as to receive the unit cell therein; and a circular support member formed between the first surface and the second surface of the current collector, wherein the support member is provided in plural, and the support members for respective regions have different diameters.

The support member may be formed in a mesh structure.

The support member may be made of a flexible material.

The support member may be made of a metal material.

The metal material may be selected from the group consisting of SUS, Crofer, ZMG, and Ni.

The support member may further include a coating layer made of silver or a conductive ceramic material.

The groove may have a shape surrounding a portion of the unit cell.

The first surface of the current collector may be formed in a mesh structure.

The solid oxide fuel cell may have a cylindrical shape.

The unit cell may include a first electrode, an electrolyte, and a second electrode.

The second surface of the current collector may have a penetration hole formed therein.

According to another preferred embodiment of the present invention, there is provided a solid oxide fuel cell, including: a unit cell; a current collector formed in a flat shape having a first surface and a second surface, the first surface including a groove formed in a thickness direction so as to receive the unit cell therein; and a plate type support member having one end connected to the first surface of the current collector and the other end connected to the second surface of the current collector.

The support member may be made of a flexible material.

The groove may have a shape surrounding a portion of the unit cell.

The first surface of the current collector may be formed in a mesh structure.

The solid oxide fuel cell may have a cylindrical shape.

The unit cell may include a first electrode, an electrolyte, and a second electrode.

The second surface of the current collector may have a penetration hole formed therein.

The support member may be made of a metal material.

The support member may further include a coating layer made of silver or a conductive ceramic material.

DESCRIPTION OF THE PREFERRED EMBODIMENTS

Figure 1:
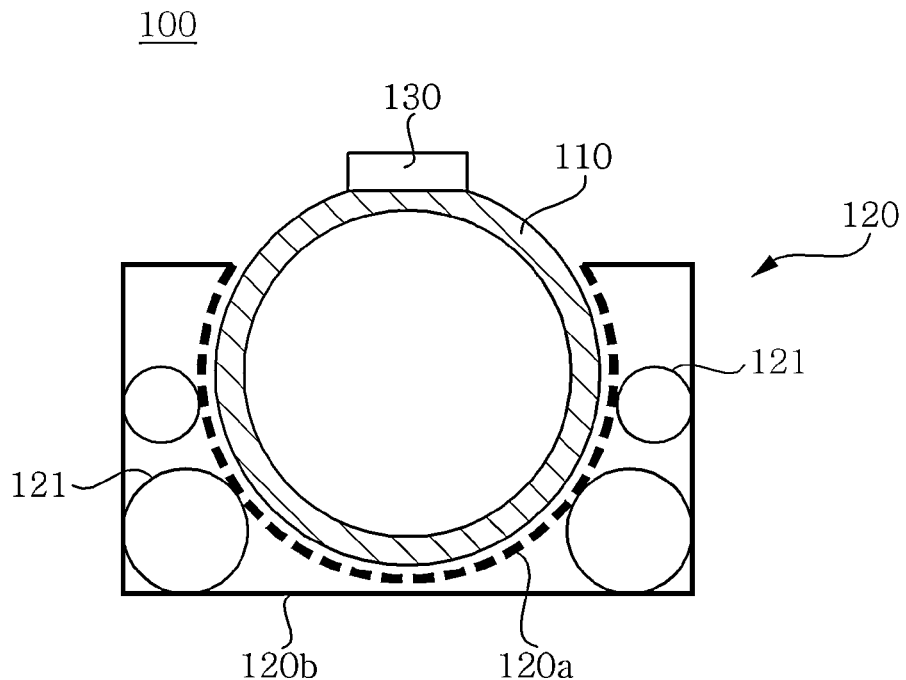
FIGS. 1 and 2 are cross-sectional views showing structures of solid oxide fuel cells according to a first preferred embodiment of the present invention.

Various objects, advantages and features of the invention will become apparent from the following description of preferred embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted. Terms used in the specification, 'first', 'second', etc. can be used to describe various components, but the components are not to be construed as being limited to the terms.

Hereinafter, preferred embodiments of the present invention will be described in detail with reference to the accompanying drawings.

Solid Oxide Fuel Cell

First Preferred Embodiment

Figure 2:
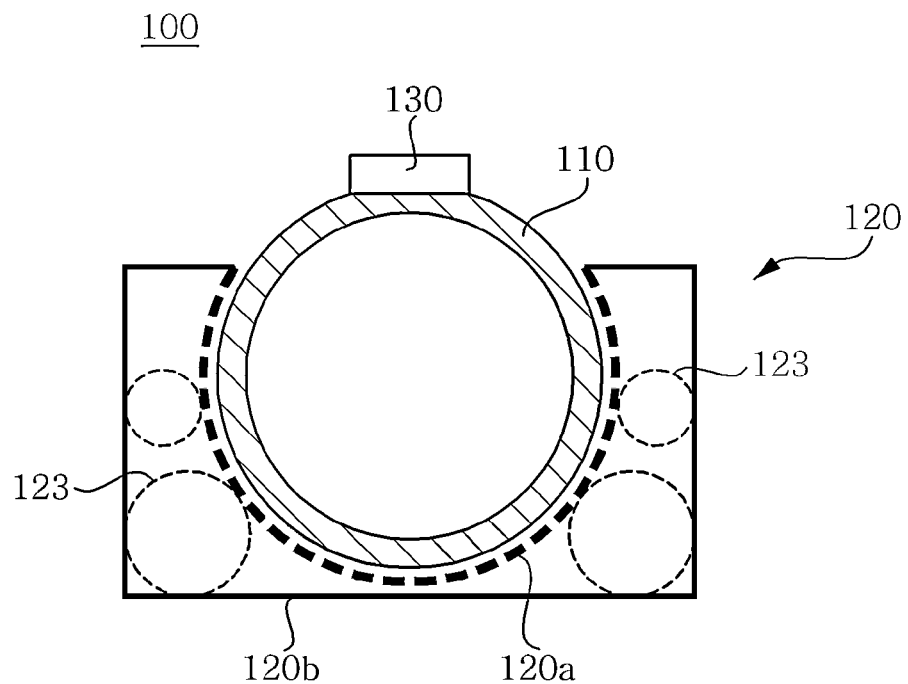

FIGS. 1 and 2 are cross-sectional views showing structures of solid oxide fuel cells according to a first preferred embodiment of the present invention.

As shown in FIGS. 1 and 2, each solid oxide fuel cell 100 may include a unit cell 110; a current collector 120 formed in a flat shape having a first surface 120a and a second surface 120b, the first surface 120a including a groove formed in a thickness direction so as to receive the unit cell 110; and a circular support member 121 or 123 formed between the first surface 120a and the second surface 120b of the current collector 120.

The solid oxide fuel cell 100 employs an oxygen ion electrolyte as a separator, so that fuel including carbon or hydrogen flows on one side of the separator oxygen flow on the other side of the separator. Here, oxygen in the air moves to an anode through the electrolyte and reacts with the fuel, thereby generating carbon dioxide or water. The solid oxide fuel cell 100 generates electricity by transforming chemical reaction energy generated at the time of oxidation reaction of the fuel into electric energy.

The support member 121 or 123 may be provided in plural, and respective support members to 121 or 123 for respective regions may have different diameters.

The reason is to deal with the fact that spaces between the first surface and the second surface of the current collector 120 are different for the respective regions when the support members 121 or 123 are formed to be contacted with the first surface 120a and the second surface 120b.

In addition, the support member 121 or 123 may be made of a metal material.

Examples of the metal material may include SUS, Crofer, ZMG, and Ni, but is not limited thereto.

In addition, the support member 121 or 123 may further include a coating layer (not shown) made of silver (Ag) or a conductive ceramic material (MnCo, NiCl, La—Sr—Co oxide (LSC), La—Sr—Co—Fe oxide (LSCF), and the like).

Here, the coating layer functions to allow the support member 121 or 123 to maintain conductivity even at a high temperature.

In addition, as shown in FIG. 1, the support member 121 may be made of a flexible material.

More specifically, the support member 121 may be formed in a circular structure and made of a flexible material.

In addition, as shown in FIG. 2, the support member 123 may be formed in a mesh structure. Here, the support member 123 may be formed in a mesh structure and made of a flexible material.

Since the above-described support member 121 or 123, which is in a circular plate structure or a circular mesh structure of a flexible material, has an elastic force, it is transformable depending on the conditions (for example, external shape, weight, or the like) of the unit cell 110 mounted on the current collector 120. Thus, the support member 121 or 123 allows the current collector 120 to be further contacted with the unit cell 110, thereby improving the contact condition between the unit cell 110 and the current collector 120.

For this reason, contact resistance between the current collector 120 and the unit cell 110 can be reduced.

Also, the support member 121 or 123 is contacted with the first surface 120a and the second surface 120b of the current collector 120, to function as a patch through which current collected on the current collector 120 moves. Therefore, it can be anticipated that the current moving path can be secured in plural.

Also, since the support member 121 or 123 is contacted with the first surface 120a and the second surface 120b of the current collector 120, the distance of the current moving path can be shortened.

Also, as shown in FIGS. 1 and 2, the groove corresponding to the first surface 120a of the current collector 120 may have a shape that surrounds a portion of the unit cell 110.

Also, the first surface 120a of the current collector 120 may be formed in a mesh structure.

As such, the first surface 120a is transformed following the external shape of the unit cell 110 combined with the current collector 120, and thereby is realized in a shape that surrounds the unit cell 110. Therefore, the contact area between the unit cell 110 and the current collector 120 can be increased.

Also, penetration holes (not shown) may be formed in the second surface 120b of the current collector 120, but not limited thereto.

The reason is that air freely flows in a stack structure in which a plurality of unit cells 110 are combined with each other. Any shape that can help the air to flow may be employed, in addition to the penetration hole.

Also, as shown in FIG. 1, the first surface 120a and the second surface 120b of the current collector 120 may be contacted with each other when the unit cell 110 is mounted thereon.

Meanwhile, the solid oxide fuel cell 100 may have a cylindrical shape.

Accordingly, the unit cell 110 may have a cylindrical shape.

The unit cell 110 may include a first electrode, an electrolyte, and a second electrode, although detailed constitutions of the unit cell 110 are omitted in FIGS. 1 and 2.

Also, the solid oxide fuel cell 100 may further include a connecting member 130 formed on a region of the unit cell 110, which is exposed from the current collector 120.

Here, the connecting member 130 has a constitution for transmitting negative current generated from an anode (not shown) of the unit cell 110 to the outside of the unit cell 110.

Solid Oxide Fuel Cell

Second Preferred Embodiment

Figure 3:
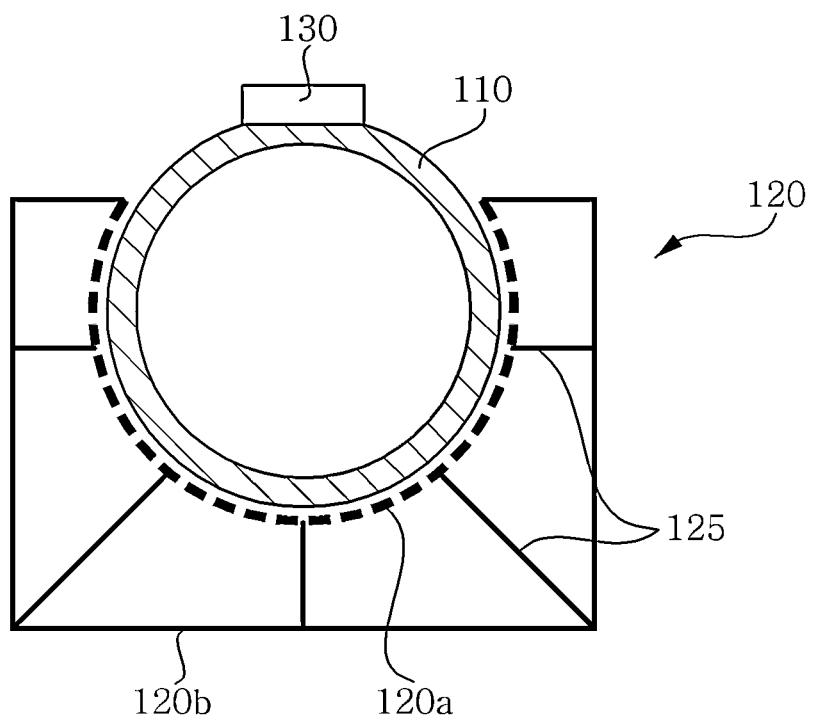
FIG. 3 is a cross-sectional view showing a structure of a solid oxide fuel cell according to a second preferred embodiment of the present invention.

FIG. 3 is a cross-sectional view showing a structure of a solid oxide fuel cell according to a second preferred embodiment of the present invention.

However, in the second present preferred embodiment, a description for the same components as those of the first preferred embodiments will be omitted and a description only for components different therefrom will be provided.

As shown in FIG. 3, a solid oxide fuel cell 100 may include a unit cell 110; a current collector 120 formed in a flat shape having a first surface 120a and a second surface 120b, the first surface 120a including a groove formed in a thickness direction so as to receive the unit cell 110; and a plate type circular support member 125 having one end connected to the first surface 120a of the current collector 120 and the other end connected to the second surface 120b of the current collector 120.

In addition, the support member 125 may be made of a flexible material.

More specifically, the support member 125 has a comb teeth pattern in which the first surface 120a and the second surface 120b of the current collector 120 are connected to each other. The support member 125 is made of a flexible material, and thus, it may have elastic force.

In addition, the support member 125 may be made of a metal material.

Examples of the metal material may include SUS, Crofer, ZMG, and Ni.

In addition, the support member 125 may further include a coating layer (not shown) made of silver (Ag) or a conductive ceramic material (MnCo, NiCr, La—Sr—Co oxide (LSC), La—Sr—Co—Fe oxide (LSCF), and the like).

Here, the coating layer functions to allow the support member 125 to maintain conductivity even at a high temperature.

Also, the groove corresponding to the first surface 120a of the current collector 120 may have a shape that surrounds a portion of the unit cell 110.

Here, the first surface 120a of the current collector 120 may be formed in a mesh structure.

As such, the first surface 120a is transformed correspondingly to the external shape of the unit cell 110 combined with the current collector 120, and thereby is realized in a shape that surrounds the unit cell 110. Therefore, the contact area between the unit cell 110 and the current collector 120 can be increased.

Also, the solid oxide fuel cell 100 may have a cylindrical shape.

Accordingly, the unit cell 110 may have a cylindrical shape.

The unit cell 110 may include a first electrode, an electrolyte, and a second electrode, although detailed constitutions of the unit cell 110 are omitted in FIGS. 1 and 2.

Also, a penetration hole (not shown) may be formed in the second surface 120b of the current collector 120, but not limited thereto.

The reason is that air freely flows in a stack structure in which a plurality of unit cells 110 are combined with each other.

As set forth above, according to the solid oxide fuel cell of the preferred embodiment of the present invention, the support member is formed within the current collector, and thus, good contact conditions between the unit cell and the current collector can be maintained, thereby reducing contact resistance.

Further, according to the solid oxide fuel cell of the preferred embodiment of the present invention, the support member is formed within the current collector, and thus, a path of collected current can be shortened and a plurality of paths for current flow can be formed, thereby improving the performance of the solid oxide fuel cell.

Further, according to the solid oxide fuel cell of the preferred embodiment of the present invention, the structure for current collection can be simplified, thereby reducing a manufacturing procedure and manufacturing cost.

Although the embodiment of the present invention has been disclosed for illustrative purposes, it will be appreciated that a solid oxide fuel cell according to the invention is not limited thereby, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A solid oxide fuel cell, comprising:
a unit cell;
a hollow current collector surrounded by a first surface and a second surface, the first surface including a groove formed in a thickness direction so as to receive a portion of the unit cell therein that has a shape that surrounds a portion of the unit cell; and
at least one or more circular support members formed to be contacted with the first surface and the second surface of the current collector,
wherein the support members are provided in plural, and the circular support members for respective regions have different diameters depending on a space between the first surface and the second surface.

2. The solid oxide fuel cell as set forth in claim 1, wherein the support member is formed in a mesh structure.

3. The solid oxide fuel cell as set forth in claim 1, wherein the support member is made of a flexible material.

4. The solid oxide fuel cell as set forth in claim 1, wherein the support member is made of a metal material.

5. The solid oxide fuel cell as set forth in claim 4, wherein the metal material is selected from the group consisting of SUS, Crofer, ZMG, and Ni.

6. The solid oxide fuel cell as set forth in claim 1, wherein the support member further includes a coating layer made of silver or a conductive ceramic material.

7. The solid oxide fuel cell as set forth in claim 1, wherein the first surface of the current collector is formed in a mesh structure.

8. The solid oxide fuel cell as set forth in claim 1, wherein the solid oxide fuel cell has a cylindrical shape.

9. The solid oxide fuel cell as set forth in claim 1, wherein the unit cell includes a first electrode, an electrolyte, and a second electrode.

10. The solid oxide fuel cell as set forth in claim 1, wherein the second surface of the current collector has a penetration hole formed therein.

* * * * *